US008576547B2

(12) United States Patent
Garrard

(10) Patent No.: US 8,576,547 B2

(45) Date of Patent: Nov. 5, 2013

(54) ELECTRICAL SWITCH BOARD SMOKE DETECTOR UNIT

(75) Inventor: Shaun William Garrard, Mt Colah (AU)

(73) Assignee: Jayzi Innovation Pty Limited (AU)

( * ) Notice: Subject to any disclaimer, the term of this patent is extended or adjusted under 35 U.S.C. 154(b) by 290 days.

(21) Appl. No.: 13/082,426

(22) Filed: Apr. 8, 2011

(65) Prior Publication Data

US 2012/0257330 A1 Oct. 11, 2012

(51) Int. Cl.
*H02B 1/04* (2006.01)

(52) U.S. Cl.
USPC ............ 361/632; 361/634; 361/643; 361/673

(58) Field of Classification Search
USPC ......... 361/605, 610, 621, 632, 634, 643, 647, 361/654, 673
See application file for complete search history.

(56) References Cited

U.S. PATENT DOCUMENTS

| | | | | | |
|---|---|---|---|---|---|
| 5,459,631 | A | * | 10/1995 | Leone et al. | 361/154 |
| 5,841,616 | A | | 11/1998 | Crosier | |
| 5,982,593 | A | * | 11/1999 | Kimblin et al. | 361/42 |
| 6,034,581 | A | * | 3/2000 | DiMarco et al. | 335/16 |
| 6,744,254 | B2 | * | 6/2004 | Clarey et al. | 324/424 |
| 7,099,129 | B2 | * | 8/2006 | Neiger et al. | 361/42 |
| 7,859,813 | B2 | * | 12/2010 | Cline et al. | 361/103 |
| 2010/0175970 | A1 | * | 7/2010 | Pieri | 200/238 |

* cited by examiner

*Primary Examiner* — Courtney Smith

(74) *Attorney, Agent, or Firm* — Galbreath Law Offices, P.C.; John A. Galbreath

(57) ABSTRACT

A safety module (24) is adapted to be connected to one or more smoke detectors (36) and mounted adjacent circuit breakers (12, 14) on a switch board (10). The safety module has an arm (26) that overlies the circuit breaker levers (28, 30) of the adjacent circuit breakers (12, 14). When a smoke alarm activates the arm (26) moves the circuit breaker levers (28, 30) to an open position.

12 Claims, 1 Drawing Sheet

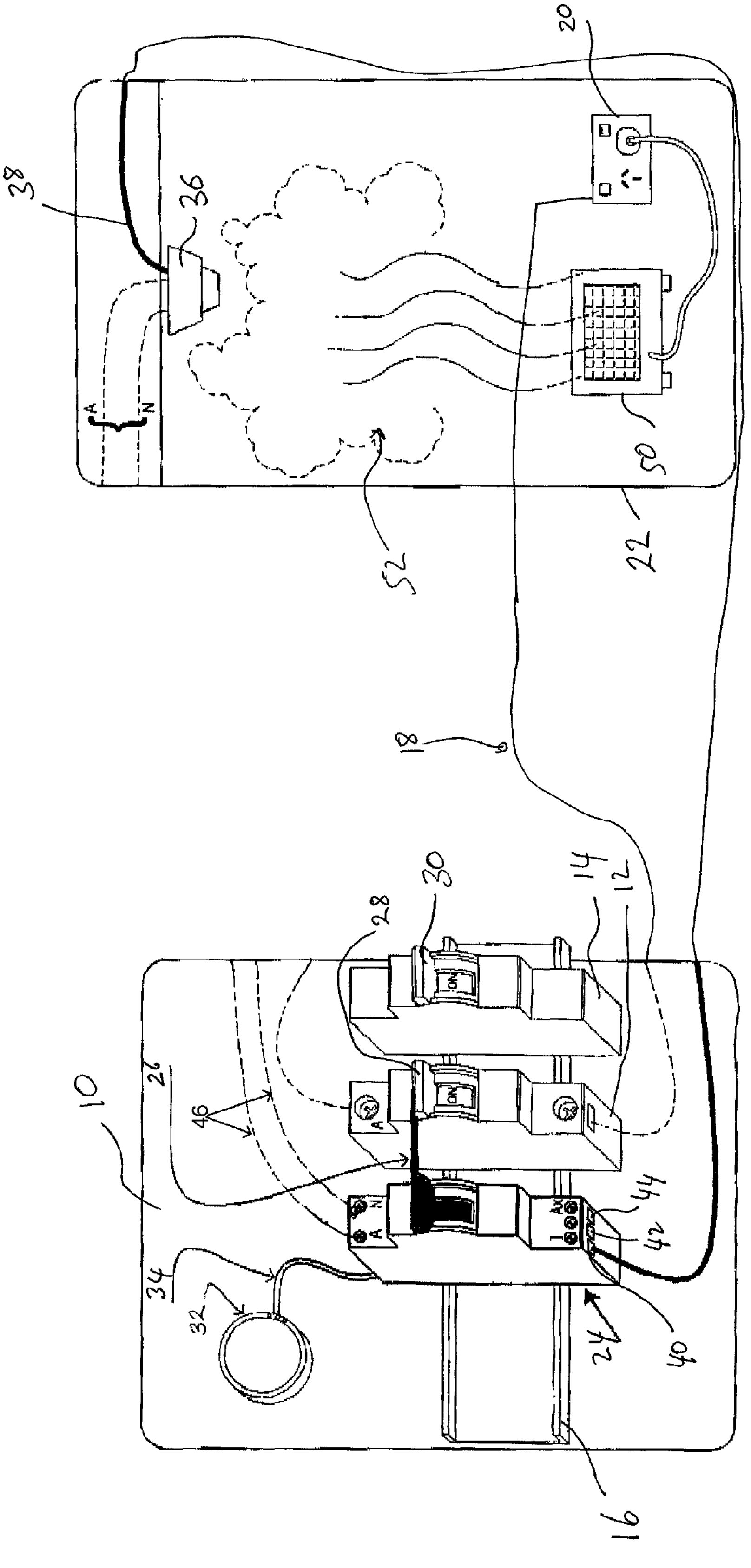
10
12
14
16
18
20
22
24
26
28
30
32
34
36
38
40
42
44
46
50
52
A
N
ON

ELECTRICAL SWITCH BOARD SMOKE DETECTOR UNIT

FIELD OF INVENTION

This invention relates to disconnection of electrical supply in buildings and in electrical switch boards, when potential fire is detected. However the invention is not limited to switch board fires or faults.

BACKGROUND

Smoke alarms are common in both residential and commercial buildings. However, they merely warn of a fire and do nothing to disconnect electrical power. Many fires are caused by electrical products, either due to failure or inappropriate positioning or use. For example, an electric heater may be covered or knocked over or hard wired items, such as an electric stove, may cause a fire.

If no one is present then no action will probably occur. With electrical items, power will remain supplied until the electrical item is sufficiently damaged that a short circuit of some form occurs, tripping a fuse, circuit breaker (CB) or Residual Current Detector (RCD). However, by this stage a fire will usually have been established and be self fuelling—removing the electrical supply will not help.

In addition, electrical faults are a relatively common occurrence in electrical switch boards. These are typically located outside of a building or in a wiring closet. If the switch board is outside, an internal smoke detector will not detect the smoke generated by a switch board fault. If the switch board is in an internal wiring closet, a fire may be established before sufficient smoke escapes the closet to be detected. Further, whether inside or outside a building, a fire in a switch board can easily penetrate into roof spaces or internal cavities because the electrical wires inherently breach any fire walls or other barriers that impede spread of fire.

SUMMARY OF THE INVENTION

In an attempt to ameliorate at least some of the disadvantages of existing systems the present invention provides a module for mounting on an electrical switch board. The module is connected to one or more smoke detectors and is activated when a smoke detector activates.

The module may be mounted next to existing circuit breakers and when activated mechanically flips the circuit breaker lever of one or more adjacent circuit breakers to an open position, thereby disconnecting the power supply to the relevant circuits. Thus the module may be retrofitted to an existing switch board.

The module may incorporate a circuit breaker, such that it does not take up an additional place in a switch board. Such an embodiment is of particular use for new installations or installations where switch board space is limited.

A smoke detector may be located on or adjacent the switch board, such as in the switch box or wiring closet, for detecting of switch board faults. Alternatively or in addition, a smoke detector located within the building may be connected to the module. Embodiments may have the smoke detector incorporated into the module itself.

A single module may be connected to more than one smoke detector. Similarly, a single smoke detector may be connected to more than one module. This may occur where the physical positioning of circuit breakers may require multiple modules, such as when located on different rails of a switch board.

The use of a separate module to mechanically switch appropriate circuit breakers means that no modifications need to be made to the electrical circuits protected by the adjacent circuit breakers.

BRIEF DESCRIPTION OF THE DRAWINGS

FIG. 1 shows a schematic layout of part of a switch board and part of building including a module according the invention.

DETAILED DESCRIPTION OF PREFERRED EMBODIMENT

Referring to the drawings there is shown a switch board 10 having two circuit breakers 12, 14 mounted on the board. Typically the circuit breakers 12 are mounted on the board via a DIN rail 16. The circuit breaker 12 may be a main switch, a RCD or a normal circuit breakers controlling supply of power to a separate electrical circuit 18. In the embodiment circuit 18 supplies power to a general power outlet (GPO) 20 in building 22 but may supply hard wired item, such as a stove.

Mounted adjacent the circuit breaker 12 is a module 24 according to the invention. The module 24 is sized to take up the space of a standard single pole circuit breaker and is designed to mount on the din rail 16, but this is not critical. The module 24 has a drive arm 26 that extends sideways and above the reset arm 28 of the adjacent circuit breaker 12. The drive arm 26 may extend in both directions and may extend over more than one circuit breaker. Thus, for example, the drive arm 26 could extend over the reset arm 30 of circuit breaker 14 and any circuit breakers located to the left of the module.

The reset arms 28, 30 of the circuit breakers are shown in the "power on" position and move downwards to break the circuit. The location of the drive arm 26 above the reset arms 28, 30 thus does not prevent each individual circuit breaker activating in an overload situation. Thus tripping of a circuit breaker due to a fault in the circuit will not cause drive arm 26 of module 24 to move and trip any other circuit breakers. Nor does the drive arm 26 prevent or limit the ability of a user to reset the individual circuit breaker to the power on position after the circuit breaker has "tripped".

The module's drive arm 26 is driven by a conventional circuit breaker solenoid mechanism. The specific drive mechanism is not critical. However, activation of the mechanism is in response to a signal from one or more smoke detectors 32 rather then excess current in a circuit. In the preferred installation a smoke detector 32 is located in the switch board enclosure and connected to the module by signal wires 34. However, the smoke detector may be remote from the switch board enclosure, such as within the building, as indicated by smoke detector 36. Multiple smoke detectors may be connected to a single module. Thus smoke detectors 32 and 36 may be simultaneously connected to the module 24. Thus, in the embodiment shown internal smoke detector 36 may supply an activation signal via wire 38 to input/output 40. As seen, the module 24 also has un-powered auxiliary contacts 42 and 44 that are closed when the module 24 is in a fault position. These may be used to communicate a fault state or position to a monitoring system.

Each smoke detector may be connected to more than one module, with all connected modules being activated by the one smoke detector. Multiple smoke detectors may be connected to multiple modules, whereby each module may be activated by one or a number of smoke detectors.

As an example if the switch board has multiple DIN rails populated by circuit breakers a module may be located on each DIN rail but connected to a single smoke detector.

Any smoke detector is preferably mains powered with a back up power source (battery, capacitor etc) and is more preferably a photo detector type smoke detector, rather than an ionising type detector. However, the specific type of smoke detector is not critical.

The module is supplied with powered via live and neutral wires 46. In the preferred embodiment these supply power for the drive mechanism for the drive arm 26 and the switch board detector 32. The module may also be a circuit breaker or a RCD wired in a conventional manner. In such a configuration there will be two ways of activating the drive mechanism for the drive arm 26—one will be via any connected smoke detector and the other via conventional circuit breaker current detection.

Referring to the drawings, there is shown an electric heater 50 connected via GPO 20 to circuit 18 controlled by circuit breaker 12. Due to a fault the heater 50 is emitting smoke and fumes, indicated by 52. Before any fire becomes self fuelling the smoke detector 36 detects the smoke and fumes and activates, sending a signal to the module 24 via line 38. Modern hard wired smoke detectors have an interconnect that is used to trigger other smoke alarms. This interconnect is used to send the signal via line 38.

In the preferred embodiment any activation signal sent via line 38 to the module 24 does not cause immediate activation. Instead the module preferable includes a time delay circuit and the module 24 activates only if the signal is applied for a predetermined time. This period may be fixed or may be installer (or user) adjustable.

The time delay is to prevent power being turned off immediately for an internal smoke generating event and to only turn the power off if the event continues beyond a set period. As an example, if an occupant burns some toast a kitchen smoke alarm may activate. The occupant is present to stop the burning toast (or the automatic toaster stops of its own accord) and so the source of the alarm ceases to exist. The smoke clears and the internal smoke alarm stops within a short period of time. In these circumstances we do not want the power to be cut immediately, due to the significant inconvenience and possible danger at night that this may cause. However, if no one is present the source of smoke will, generally, continue to generate smoke and the smoke alarm will continue to sound. After the preset period the module 24 activates, cutting power.

When the module activates, it drives drive arm 26 downwards. This causes reset arm 28 of circuit breaker 12 to move to the power off position, thereby removing power to circuit 18 and the heater 50 thereby removing the initial heat source and preferably preventing a self fuelling fire from starting. This all occurs without any human involvement.

When any smoke and fumes have cleared, whether due to human intervention of otherwise, the smoke alarm 36 ceases to activate and stops sending the activation signal to the module 24. As with conventional circuit breakers, the module does not reset and manual resetting is required. Resetting of the module 24 does not reset any tripped circuit breakers and so it is also necessary to manually reset circuit breaker 12.

The operation with the smoke detector 32 located on the switch board or within the switch board enclosure is substantially the same, and any smoke and fumes detected by the smoke detector 32 will result in activation of the module 24 and circuit breaker 12 as previously described. However, in this case there is no time delay and a fault detected by the smoke detector 32 will result in immediate activation of the module.

Whilst the circuit breaker 12 may be an ordinary circuit breaker supplying an internal circuit, ideally a module connected to the smoke detector 32 will trip the main power switch/circuit breaker, thereby cutting power to all the circuits connected to the switch board, irrespective of whether or not their circuit is to blame. Thus a switch board fault will have all power removed and not result in a fire.

The smoke detector 32 is preferably provided with a capacitor based backup supply rather than a battery. This avoids the need for the occupant to periodically replace a battery, since user manipulation of components in a switch board is discouraged.

When the smoke detector 32 triggers and activates module 24, the activation signal is sent via input/output 40 to any internal smoke detectors, such as smoke detector 36. Thus any occupants of the building will be notified of the switch board fault.

It will be appreciated that one module connected to the switch board smoke detector 32 may activate the main circuit breaker whilst one or more modules connected to internal smoke detectors may activate subsidiary circuit breakers.

It will be apparent to those skilled in the art that many obvious modifications and variations may be made to the embodiments described herein without departing from the spirit or scope of the invention.

I claim:

1. A safety module for mounting on an electrical switch board, the module including:

a body adapted to be mounted on an elongate mounting rail of the switchboard, the elongate mounting rail having a longitudinal direction;

at least one input for connection to at least one smoke detector, and a circuit breaker opener comprising at least one arm extending externally of the body and to at least one side of the body in the longitudinal direction and movable from a first position to a second position in response to said at least one signal received from at least one of said at least one smoke detector wherein, in use and when mounted on said mounting rail next to or adjacent to at least one first circuit breaker assembly also mounted on the mounting rail, the at least one first circuit breaker assembly having a housing enclosing a circuit breaker and a switch member extending out of the housing to be operated directly by a finger of a user, the switch member movable between open and closed positions to open and close the circuit breaker, the at least one arm extends toward said switch member of said at least one circuit breaker assembly, and when the switch member of said at least one circuit breaker assembly is in the closed position, the at least one arm is adjacent the switch member and movement of the at least one arm from the first position to the second position moves the switch member from the closed to open position.

2. The module of claim 1 including at least one second circuit breaker located within the body, and said circuit breaker opener opens the at least one second circuit breaker when at least one signal is received from at least one of said at least one smoke detector.

3. The module of claim 1 wherein the at least one switch member moves through a respective volume when moving between the open and closed positions and wherein, at the first position, the at least on arm is located adjacent the respective volume.

4. The module of claim 1 wherein the at least one arm extends to both sides of the body.

5. The module of claim 1 wherein the arm has a length to extend over at least two circuit breaker assemblies mounted adjacent the module.

6. The module of claim 1 wherein the safety module includes a time delay circuit and wherein the circuit breaker opener does not operate until the signal has been applied for a predetermined time.

7. A switchboard assembly including:

a mounting rail having a longitudinal direction;

at least one circuit breaker assembly mounted on the mounting rail, the at least one circuit breaker assembly having a housing enclosing a circuit breaker and a switch member extending out of the housing to be operated directly by a finger of a user, the switch member movable between open and closed positions to open and close the circuit breaker;

at least one safety module mounted on the mounting rail adjacent at least one of said circuit breaker assembly, the module including:

a body;

at least one input for connection to at least one smoke detector, and a circuit breaker opener, wherein said circuit breaker opener causes the switch member of the at least one circuit breaker assembly adjacent the safety module to move from the closed position to the open position when at least one signal is received from at least one of said at least one smoke detector, the circuit breaker opener comprising at least one arm extending externally of the body and to one side of the body in the longitudinal direction and movable from a first position to a second position in response to said at least one signal;

wherein, when the switch member of said at least one circuit breaker assembly is in the closed position, the at least one arm is adjacent to the switch member and movement of the at least one arm from the first position to the second position moves the switch member from the closed to open position.

8. The switchboard assembly of claim 7 wherein the module includes at least one second circuit breaker within the body, and said circuit breaker opener opens the at least one second circuit breaker when at least one signal is received from at least one of said at least one smoke detector.

9. The switchboard assembly of claim 7 wherein the at least one switch member moves through a respective volume when moving between the open and closed positions and wherein, at the first position, the arm is located adjacent the respective volume.

10. The switchboard assembly of claim 7 wherein the at least one arm extends to both sides of the body.

11. The switchboard assembly of claim 7 wherein the arm has a length to extend over at least two circuit breaker assemblies mounted adjacent the module.

12. The switchboard assembly of claim 7 wherein the at least one safety module includes a time delay circuit and wherein the circuit breaker opener does not operate until the signal has been applied for a predetermined time.

* * * * *